(12) United States Patent
Nath et al.

(10) Patent No.: US 7,321,317 B2
(45) Date of Patent: *Jan. 22, 2008

(54) METHOD FOR INTELLIGENT PARKING/POLLUTION AND SURVEILLANCE CONTROL SYSTEM

(75) Inventors: Sanjeev Nath, New York, NY (US); Rajesh Patel, Rocky Hill, CT (US)

(73) Assignee: Nattel Group, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/478,510

(22) Filed: Jun. 29, 2006

(65) Prior Publication Data

US 2006/0244634 A1 Nov. 2, 2006

Related U.S. Application Data

(63) Continuation of application No. 10/716,023, filed on Nov. 18, 2003, now Pat. No. 7,071,839, and a continuation of application No. 10/704,456, filed on Nov. 7, 2003, now Pat. No. 7,230,545.

(51) Int. Cl.
*G08G 1/01* (2006.01)
(52) U.S. Cl. ............... 340/933; 340/932.2; 340/425.5; 705/13; 705/418; 701/117
(58) Field of Classification Search .................. None
See application file for complete search history.

(56) References Cited

U.S. PATENT DOCUMENTS

| 3,034,287 A | 5/1962 | Odom et al. |
| 3,720,911 A | 3/1973 | Bomar, Jr. |
| 3,955,560 A | 5/1976 | Stein et al. |
| 4,031,991 A | 6/1977 | Malott |
| 4,137,520 A | 1/1979 | Deveau |
| 4,183,203 A | 1/1980 | Maezawa et al. |
| 4,297,683 A | 10/1981 | Roberts |
| 4,742,573 A | 5/1988 | Popovic |
| 4,837,568 A | 6/1989 | Snaper |
| 5,204,670 A | 4/1993 | Stinton |
| 5,263,118 A * | 11/1993 | Cornelison ................. 704/200 |

(Continued)

FOREIGN PATENT DOCUMENTS

CA 2413198 A1 5/2003

OTHER PUBLICATIONS

U.S. Appl. No. 10/704,456, filed Nov. 2003, Nath et al.*

(Continued)

*Primary Examiner*—Benjamin C. Lee
(74) *Attorney, Agent, or Firm*—Kelley Drye & Warren LLP

(57) ABSTRACT

The invention relates to systems to manage parking meters using mechanical, electrical and electromechanicals monitoring and transmitting devices. Such intelligent parking meters may be used for example to monitor pollution by idling vehicles, survey the area about the meters to identify events such as vandalism, accident or any other designated emergency situation, and to monitor volume and flow of traffic to help coordinate traffic light sequencing for facilitating optimum traffic movement. The meters may be coin, bill or card operated and are useful for monitoring individual parking spaces designed to monitor conditions ambient to the parking meter and issue summons to vehicles violating the preset requirements.

16 Claims, 9 Drawing Sheets

U.S. PATENT DOCUMENTS

| | | | |
|---|---|---|---|
| D355,903 S | 2/1995 | Pollack et al. | |
| 5,740,050 A * | 4/1998 | Ward, II | 705/418 |
| 5,796,084 A | 8/1998 | Olsson | |
| 5,829,913 A | 11/1998 | Puckett | |
| 5,895,450 A | 4/1999 | Sloo | |
| 6,052,065 A | 4/2000 | Glover | |
| 6,081,206 A * | 6/2000 | Kielland | 340/937 |
| 6,104,299 A | 8/2000 | Brusseaux et al. | |
| 6,107,942 A | 8/2000 | Yoo et al. | |
| 6,133,855 A | 10/2000 | Kim | |
| 6,243,029 B1 * | 6/2001 | Tomer | 340/932.2 |
| 6,340,935 B1 | 1/2002 | Hall | |
| 6,426,708 B1 | 7/2002 | Trajkovic et al. | |
| 6,505,774 B1 | 1/2003 | Fulcher et al. | |
| 6,513,711 B1 | 2/2003 | Hjelmvik | |
| 6,526,335 B1 | 2/2003 | Treyz et al. | |
| 6,646,568 B2 | 11/2003 | MacPhail et al. | |
| 6,647,270 B1 | 11/2003 | Himmelstein | |
| 6,791,473 B2 | 9/2004 | Kibria et al. | |
| RE38,626 E * | 10/2004 | Kielland | 340/937 |
| 6,816,085 B1 | 11/2004 | Haynes et al. | |
| 7,071,839 B2 * | 7/2006 | Patel et al. | 340/933 |
| 2002/0008639 A1 | 1/2002 | Dee | |
| 2002/0024451 A1 * | 2/2002 | Rosenberg | 340/932.2 |
| 2002/0109610 A1 | 8/2002 | Katz | |
| 2002/0109611 A1 | 8/2002 | Howard | |
| 2003/0055701 A1 | 3/2003 | Dutta et al. | |
| 2003/0083928 A1 * | 5/2003 | MacKay | 705/13 |
| 2003/0132840 A1 * | 7/2003 | Bahar | 340/541 |
| 2003/0135407 A1 * | 7/2003 | Reinhardt et al. | 705/13 |
| 2004/0068433 A1 * | 4/2004 | Chatterjee et al. | 705/13 |
| 2004/0075581 A1 * | 4/2004 | Staniszewski | 340/932.2 |
| 2004/0094619 A1 * | 5/2004 | Silberberg | 235/382 |
| 2005/0068196 A1 * | 3/2005 | Marin | 340/932.2 |
| 2005/0088320 A1 | 4/2005 | Kovach | |
| 2006/0106504 A1 * | 5/2006 | Carpenter | 701/1 |

OTHER PUBLICATIONS

Bluetooth, "All products" from www.bluetooth.com, not dated.
Bluetooth, "What are some of the technical details of the Bluetooth wireless specifications?" from www.bluetooth.org copyright, 2003-2004, not dated.
Bluetooth, "In what kinds of products can I expect to find Bluetooth wireless technology?" from www.bluetooth.org copyright 2003-2004, not dated.
Bluetooth, Bluetooth Enabled Products-Handheld Gryphon BT100-CS Bluetooth Cordless System from www.bluetooth.com, not dated.
Datalogic, "Products," from www.datalogic.com, not dated.
Infrared Data Association (IrDA), "IrDA Specifications and Technical Notes," www.irda.org, not dated.
Infrared Data Association, "Point and Shoot Profile," Version 1.1, Mar. 20, 2000 from www.irda.org.
Polgreen, Lydia, New York Times, "To Get the Phone, Drivers are Willing to Risk Getting a Ticket," Sep. 2, 2003.
Job, Ann, "How to deal with Distracted Drivers," Report from http://Autos.msn.com;advice, not dated.

* cited by examiner

COMPONENTS OF TIPS

METHOD FOR INTELLIGENT PARKING/POLLUTION AND SURVEILLANCE CONTROL SYSTEM

RELATED APPLICATIONS

This is a continuation of U.S. patent application Ser. No. 10/704,456, filed Nov. 7, 2003 U.S. Pat. No. 7,230,545, and U.S. patent application Ser. No. 10/716,023, filed Nov. 18, 2003, U.S. Pat. No. 7,071,839.

The disclosure of each such application is hereby incorporated by reference in its entirety where appropriate for teachings of additional or alternative details, features, and/or technical background, and priority is asserted from each.

BACKGROUND

1. Field of Invention

The present invention described and claimed herein relates to systems to manage parking at mechanical, electrical and electromechanicals, intelligent parking meters that may be coin, bill or card operated in particular parking meters that are useful for monitoring individual parking spaces designed to monitor conditions ambient to the parking meter. Such intelligent parking meters may be used for example to monitor pollution by idling vehicles, survey the area about the meters to identify events such as vandalism, accident or any other designated emergency situation, and to monitor volume and flow of traffic to help coordinate traffic light sequencing for facilitating optimum traffic movement. These meters are mounted as single meters in each of a series of parking spaces located along long roadways or in parking lots.

2. Discussion of Prior Art

Mechanical, electric, and electromechanical parking meters are known in the art. Automated parking ticket dispensers and fee collection devices are also known in the art and include devices as described for example in U.S. Pat. Nos. 4,031,991 and 4,183,205.

While these devices fulfill their respective particular objectives and requirements, each lacks a total intelligent parking/pollution! surveillance control system ("T.IP.P.S."), as described in the present disclosure.

SUMMARY OF THE INVENTION

3. Discussion of Related Art

The methods and systems of the presently disclosed control system employ intelligent parking enforcement devices, preferably parking meters, capable of wireless communication with an automobile registration control system ("A.R.C.S.").

In one embodiment, parking meters are employed that sense the presence of a vehicle in a metered zone and are capable of resetting the residual parking time to zero when a stationary/parked/idling vehicle pulls out of the metered zone. Preferred parking meters of the present invention are intelligent parking enforcement devices which monitor and enforce parking/idling regulations and may be programmed to facilitate the enforcement of other regulations as defined, specified and as deemed necessary by the local law enforcement authorities. As would be understood by one of ordinary skill in the art reading this disclosure, by providing improved parking/idling regulations enforcement, additional availability of parking spaces is provided. A control system of the present invention may make use of a remote monitoring module to assist monitoring, management and centralization of a process.

In one embodiment, a parking meter which may be coin/bill/card operated, includes a meter housing having a card reader slot and a coin/bill receiving slot, a transreceiver module and a spaced transparent enclosure window on top of the housing. An electronic luminescent time indicator (LCD display) is mounted in the housing and displays the remaining time.

In another embodiment of the invention, one or more of the intelligent parking enforcement devices optionally senses idling vehicles whether stationary or parked in a metered zone, tracks traffic volume and flow, provides time-lapse and full motion real time images, and/or self-generates a summons during the commission of a violation without human intervention.

As would be understood by one of ordinary skill in the art reading this disclosure, the present invention may be used to significantly reduce the operational costs conventionally associated with enforcement regulation, as well as to eliminate errors caused by human resource utilization.

In one embodiment of the control system of the present invention, a system is provided to collect a parking fee by any of the known payment collection methodologies (e.g., parking card reader, coin/bills/credit-card and direct deduction) that takes advantage of information transmitted by an A.R.C.S. housed in a vehicle, and an intelligent wireless monitoring device ("I.W.M.D.") housed in an intelligent parking enforcement device, such as a parking meter that receives transmitted information from the A.R.C.S. through an intelligent transceiver ("I.T."). Structure of an exemplary I.W.M.D., I.T. and A.R.C.S. is disclosed in pending U.S. patent application Ser. No. 10/704,456, filed on Nov. 7, 2003, which is incorporated by reference in its entirety herein. By receiving a transmission from the A.R.C.S. of a vehicle, the system can automatically collect the parking data and other relevant information pertaining to particular parked vehicle (e.g. ownership, insurance, licensing, vehicle service maintenance information and emission data).

A control system of the present system may be operationally configured to identify vehicles idling in a metered zone with the purpose of controlling noxious gaseous emissions, communicate vehicle idling information to and from A.R.C.S. in a vehicle, communicate vehicle idling information to and from an intelligent wireless control device ("I.W.C.D."), for example an I.W.C.D. as disclosed in the co-ending U.S. patent application Ser. No. 10/704,456, filed on Nov. 7, 2003, remotely manage and track system applications without human intervention, insert/modify/update parking and other legal regulations with minimal or no human resource utilization, provide real-time surveillance, and/or may upload surveillance data to an LW.M.D. when activated by a number of pre-determined events such as vandalism, accident or any other designated emergency situation.

BRIEF DESCRIPTION OF THE DRAWINGS

The invention claimed and/or described herein is described in terms of exemplary embodiments. These exemplary embodiments are described in detail with reference to drawings, which are part of the description of the invention. These embodiments are non-limiting exemplary embodiments, in which like reference numerals represent similar structures throughout the several views of the drawings, and wherein:

DETAILED DESCRIPTION

Figure 1:
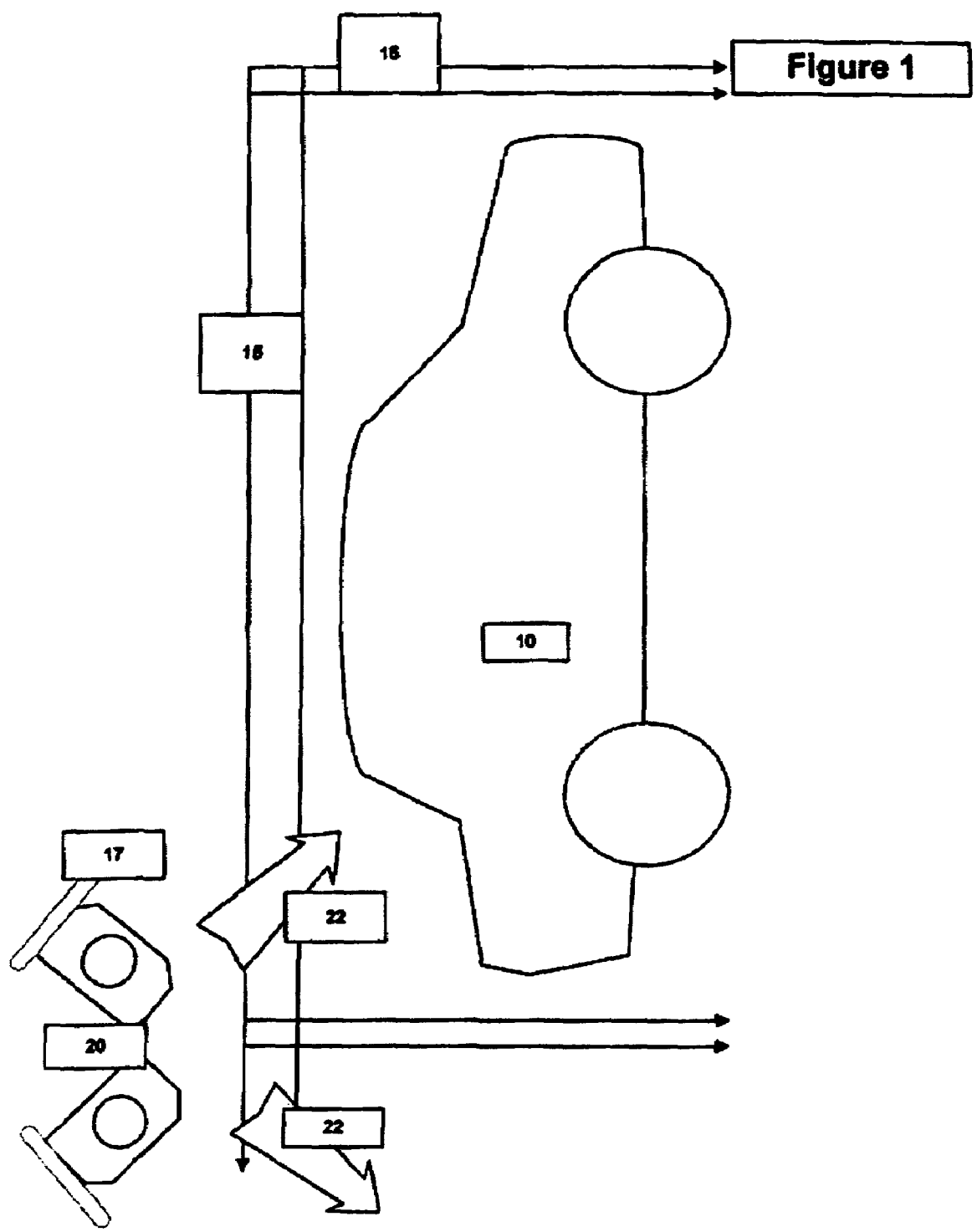
FIG. 1 depicts an exemplary side view of an automobile located along side a T.I.P.P.S. module, according to a first embodiment of the present invention.

FIG. 1 illustrates one embodiment of the invention, FIG. 1 depicts an exemplary side view of an automobile 10 with an arrangement to ensure monitoring of the stationary/parked vehicle. Total intelligent parking system 20 emits a narrow signal beam 22 around an area where the vehicle 10 is parked. In this depicted embodiment, the emitter 17 is installed in the parking meter 20. For example, the emitter may be installed on the side frame of the parking meter cabinet. The wireless signal beam 22 is then transmitted towards the area around the stationary/parked vehicle. The lines 15 and 16 define the imaginary boundary for parking the vehicle in a metered zone.

Figure 2:
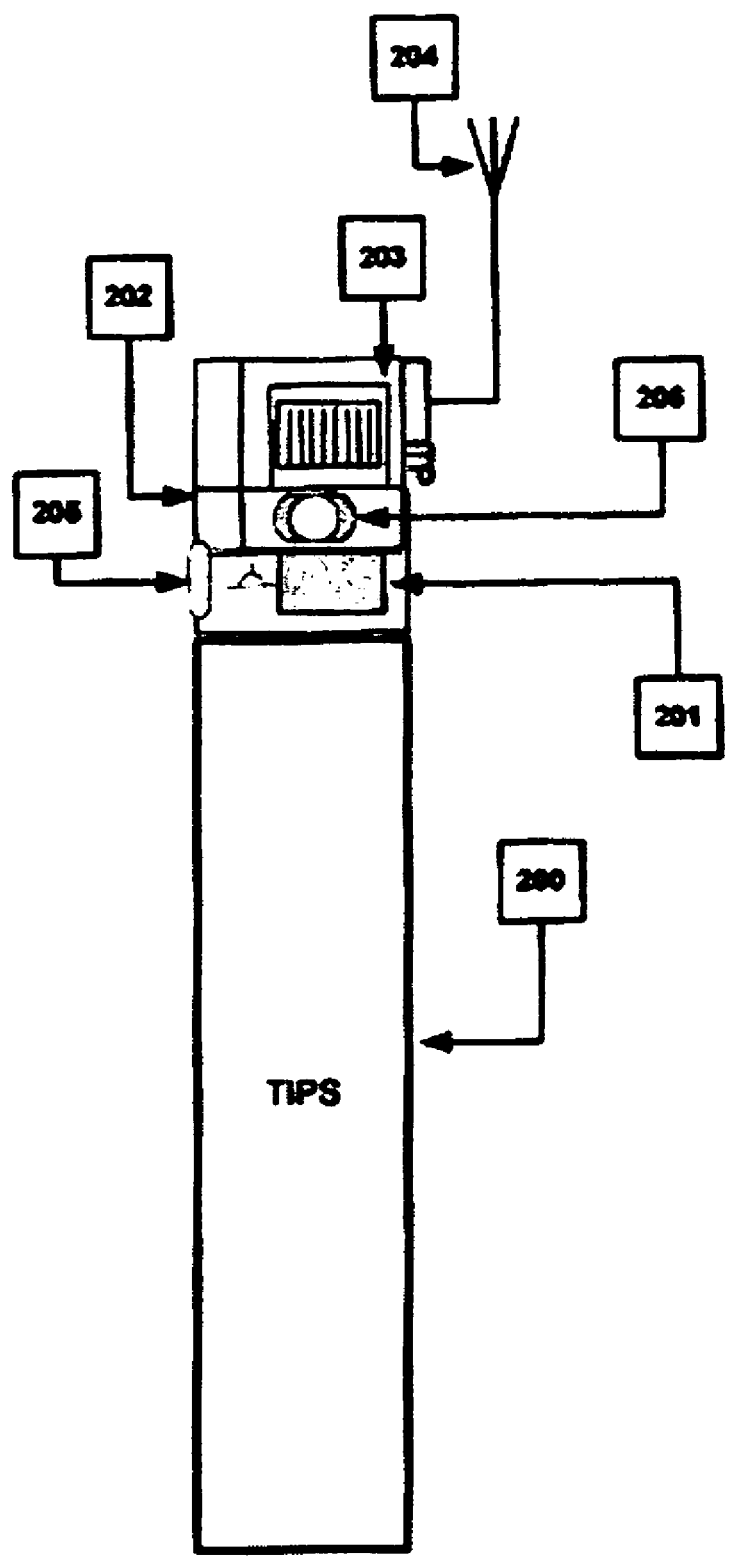
FIG. 2 depicts an visual diagram of a T.I.P.P.S. embodiment, according to the present invention.

FIG. 2 is an exemplary functional block diagram of a T.I.P.P.S. embodiment, which is a fully functional independent parking system 200. The housing of T.I.P.P.S. 200 is preferably aesthetically pleasing. In addition to the simplicity of its design, its easy prompts result in a user-friendly device. The case itself is forged in heavy gauge, reinforced cold rolled steel, with a durable color coat. The interior of the case is fully insulated to protect the internal components in extreme conditions.

Two pairs of miniature surveillance camera 206 (facing in all four directions) are configured with a time-lapse recording mechanism, which can automatically upload the surveillance data to the LW.M.D. in case of vandalism, accident or in any other designated or emergency situation. In addition to this, both pairs of surveillance cameras are also capable of transmitting real-time full motion images from any designated site.

With full backward compatibility with the legacy parking meter, total intelligent parking system (T.I.P.P.S.) is fully equipped with an intelligent controller, a display panel 203, a communication (wireless) port 202, a unique coin/bills/card slot 201 and a signal emitter/receiver 204. The connector 205 provides universal connectivity (backward compatibility) with most of the legacy parking meters.

The wireless port may correspond to a RF, WLAN IEEE 802.11x & 802.16x standards, Bluetooth or an IR port, where the wireless 802.11x covers the area of about 3 blocks, the wireless 802.16x covers the area of about 7 miles, a blue tooth system covers a diameter range of around 330 feet and an "IrDA" infrared red system generally covers less than 5-10 feet with a proper line of sight. This technology as is described in greater detail below The Bluetooth's native ad-hoc network property makes it very useful by replacing bulky cables, providing printing support or acting as ID cards. The Bluetooth wireless specification includes both link layer and application layer definitions for product developers, which support data, voice, and content-centric applications. Handheld wireless communication devices that comply with the Bluetooth wireless specification operate in the unlicensed, 2.4 GHz radio spectrum ensuring communication compatibility worldwide. These radios use a spread spectrum, frequency hopping, full-duplex signal at up to 1600 hops/sec. The signal hops among frequencies at 1 MHz intervals to give a high degree of interference immunity. Up to seven simultaneous connections can be established and maintained. Further details can be viewed at www.bluetooth.org or www-.bluetooth.com.

The IrDA specifications, on the other hand, is intended for high speed short range, line of sight, point-to-point cordless data transfer suitable for handheld communication devices. Since 1984, "JrDA Data" defines a standard for an interoperable universal two way cordless infrared light transmission data port. IrDA technology is already in over 300 million electronic devices including PC's, PDA's, cellular phones, cameras, toys, watches and many other mobile devices. Main characteristics of IrDA signaling include:

Range: Continuous operation between two contacts for at least 1 meter.
Bi-directional communication is the basis of all specifications.
Data transmission starting from 9600 kbps primary speed going up to 4.0 mbps.
Data packets are protected using CRC (from CRC 16 for speeds up to 1.152 mbps to CRC-32 at 4.0 mbps).

Radio waves are created due to the movement of electrical charges in antennas. As they are created, these waves radiate away from the antenna. All electromagnetic waves travel at the speed of light. The major differences between the different types of waves are the distances covered by one cycle of the wave and the number of waves that pass a certain point during a set time period. The wavelength is the distance covered by one cycle of a wave. The frequency is the number of waves passing a given point in one second. For any electromagnetic wave, the wavelength multiplied by the frequency equals the speed of light. The frequency of an RF signal is usually expressed in units called hertz (Hz). One Hz equals one wave per second. One kilohertz (kHz) equals one thousand waves per second, one megahertz (MHz) equals one million waves per second, and one gigahertz (GHz) equals one billion waves per second.

RF energy includes waves with frequencies ranging from about 3000 waves per second (3 kHz) to 300 billion waves per second (300 0 Hz). Microwaves are a subset of radio waves that have frequencies ranging from around 300 million waves per second (300 MHz) to three billion waves per second (3 GHz).

Basically WLAN is an ordinary LAN protocol, which is a modulated carrier of radio frequency waves. WLAN IEEE 801.11 is a natural extension to LAN Ethernet, and the modulated protocol is IEEE 802.3 (Ethernet 3).

Common WLAN Products, which are using IEEE standards, are based on IEEE 802.11 and 802.11b specification. 802.11b is a high rate extension to the original 802.11, and specific 5.5 to 11 Mbps data rate. The next HyperLAN2 generation using IEEE 802.11a, IEEE 802.1 Ig standards, operates in a new band frequency of 50 Hz, and achieves a high data rate as 54 Mbps. The new networking technology WiMax IEEE 802.16x should provide higher speed, and more coverage than existing Wi-Fi standards.

Figure 3:
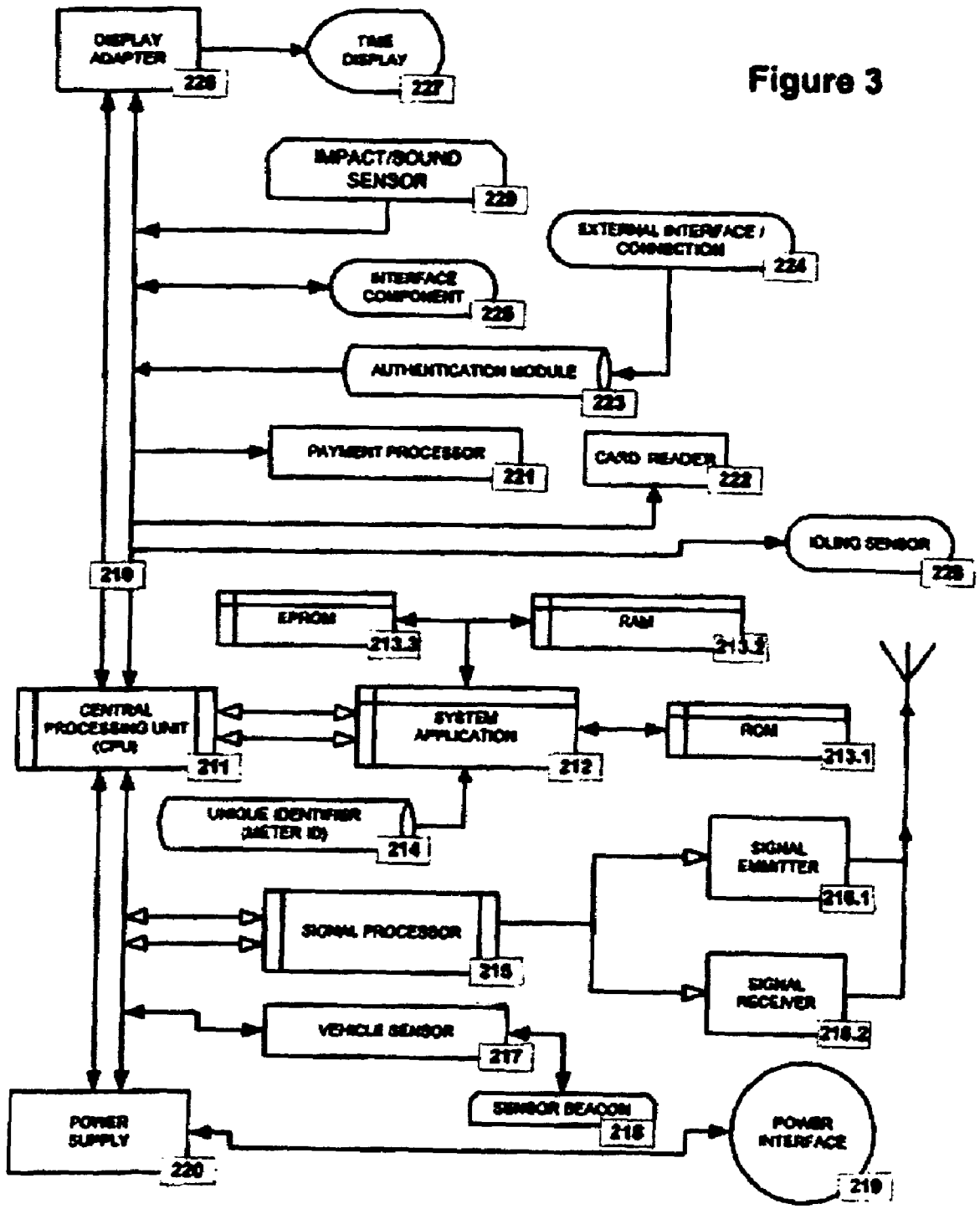
FIG. 3 depicts an exemplary functional block diagram of a T.I.P.P.S. embodiment.

FIG. 3 depicts a systematic diagram of a T.I.P.P.S. embodiment. The power to the T.I.P.P.S. 200 may be hard wired by conventional AC power lines, by solar panels, by low consumption batteries or combination of any of these or other power sources. The power supply 220 adapters regulate and supplies the correct voltage to the controller board. The module has a provision for secondary power, which can be easily interfaced, via a power interface 219.

The device has an onboard central processing unit 211 and is interconnected to the various sub-components via a system bus 210. The system application 212 runs on the processor 211 and provides control and may be used to coordinate the functions of the various components of the system. The system application 212 is stored in ROM 213.1 and its sub-functionality can temporarily be made to run from the RAM 213.2 increasing the performance of overall system communication. Some of the add-on utilities are stored on the EPROM 213.3. The Unique Meter Identifier 214 is stored in an encrypted mode on a separate media, which is readily available upon the request made by the application 212.

The presence of the vehicle 10 parked near the T.I.P.P.S. 200 is sensed by a sensor beacon 218, which is connected to a vehicle sensor controller 217. On the successful acknowledgement of the presence of the vehicle 10, the system 212 initiates the communication. The Unique Identifier 214 is transmitted to the parked vehicle 10. The idling sensor 228 continuously monitors the vehicle for idling.

T.I.P.P.S. 200 is equipped with an impact/shock/sound/vibration sensor 229, which in case of vandalism, accident or in any other designated or emergency situation immediately uploads all stored surveillance data to the I.W.M.D.

In addition to this, both pairs of surveillance cameras 206 are also capable of transmitting real-time full motion images from any designated site.

The payment processor/counter 220 is a plug-n-play interface with legacy parking meter's collection module. This T.I.P.P.S. 200 embodiment comes with a pre-installed connectivity with collector module 221. Besides coin/bills/card payment processor, T.I.P.P.S. 200 has a pre-configured modular interface component module 225, which is capable of processing the pre-paid parking cards.

T.I.P.P.S. 200 has a multi line LCD panel 227 connected via a display adapter 226, which is capable of displaying detailed information related to the parked/idling vehicle. The external interface 224 is provided for maintenance purpose, for equipment re-configurations, change or for updating the pre-existing applications or their sub modules. The authentication module 223 can authenticate any type of connectivity. The signal processor 215 differentiates between an incoming transmission via a signal receiver 216.2 and outgoing transmission via a signal emitter 216.1. The coin/bills/card payment processing is done via payment processor 221.

Figure 4:
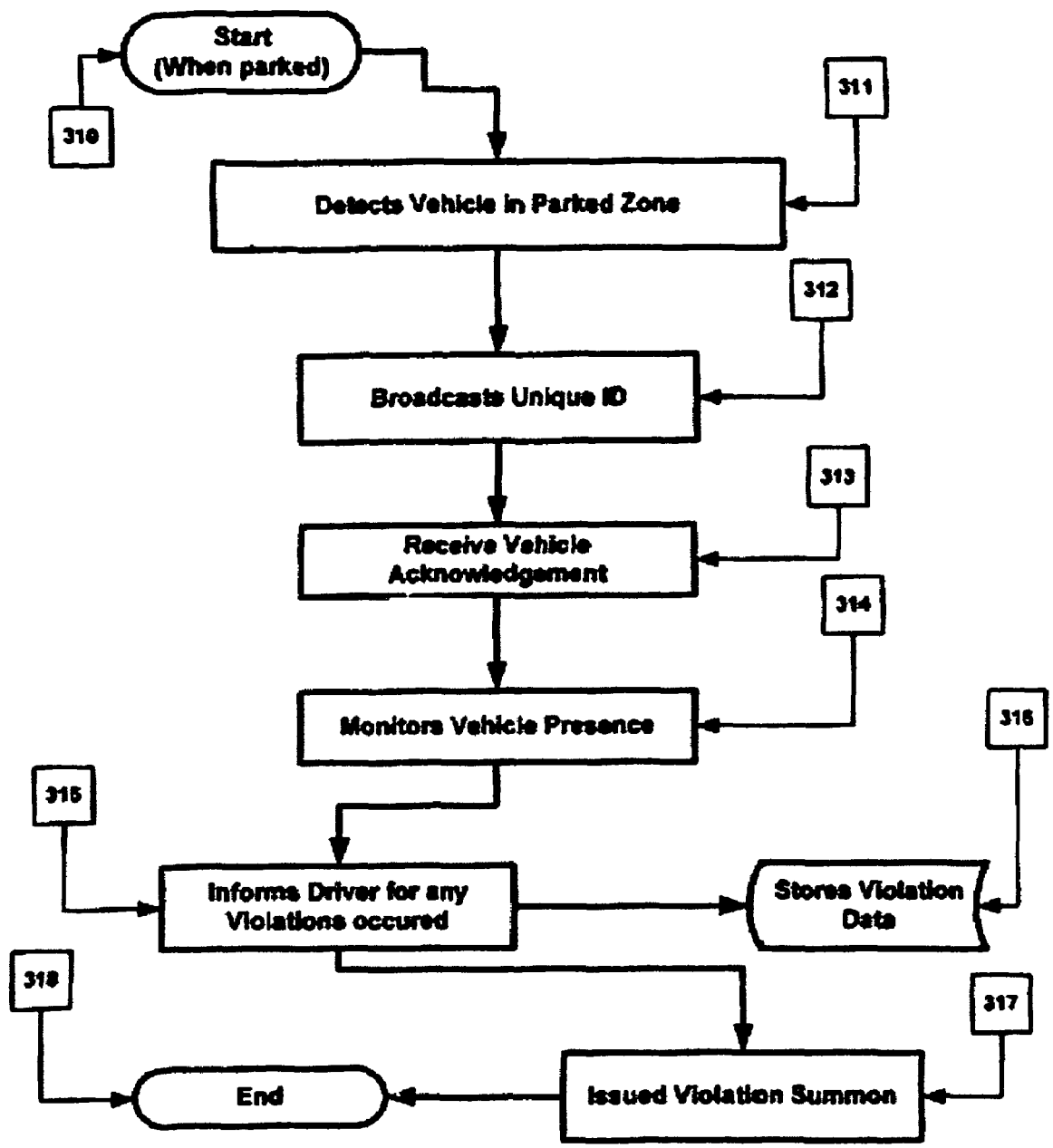
FIG. 4 depicts an exemplary flow diagram of a T.I.P.P.S. embodiment defining the steps/processes involved in detecting the presence of a parked vehicle.

FIG. 4, depicts a T.I.P.P.S. embodiment and its interaction with A.R.C.S. Step 310 is activated when vehicle comes in the range of the parking meter or enters the metered zone. Step 311 is activated when vehicle is detected in a stationary/parked/idling mode in a metered zone. Step 312 consists of exchanging the unique identifiers (in case of vehicles the vehicle identification number (V~N) and in case of the parking meter the unique meter identifier number). T.I.P.P.S. receives the stationary/parked/idling vehicle information and logs the transaction into its own memory—step 313.

T.I.P.P.S. communicates with the A.R.C.S. at regular intervals—step 314. It also informs the A.R.C.S. of an impending violation-step 315. The A.R.C.S. receives the violation warning that the vehicle is in violation. The transaction is logged into its local drive step 316. A violation summons is issued-step 317.

Figure 5A:
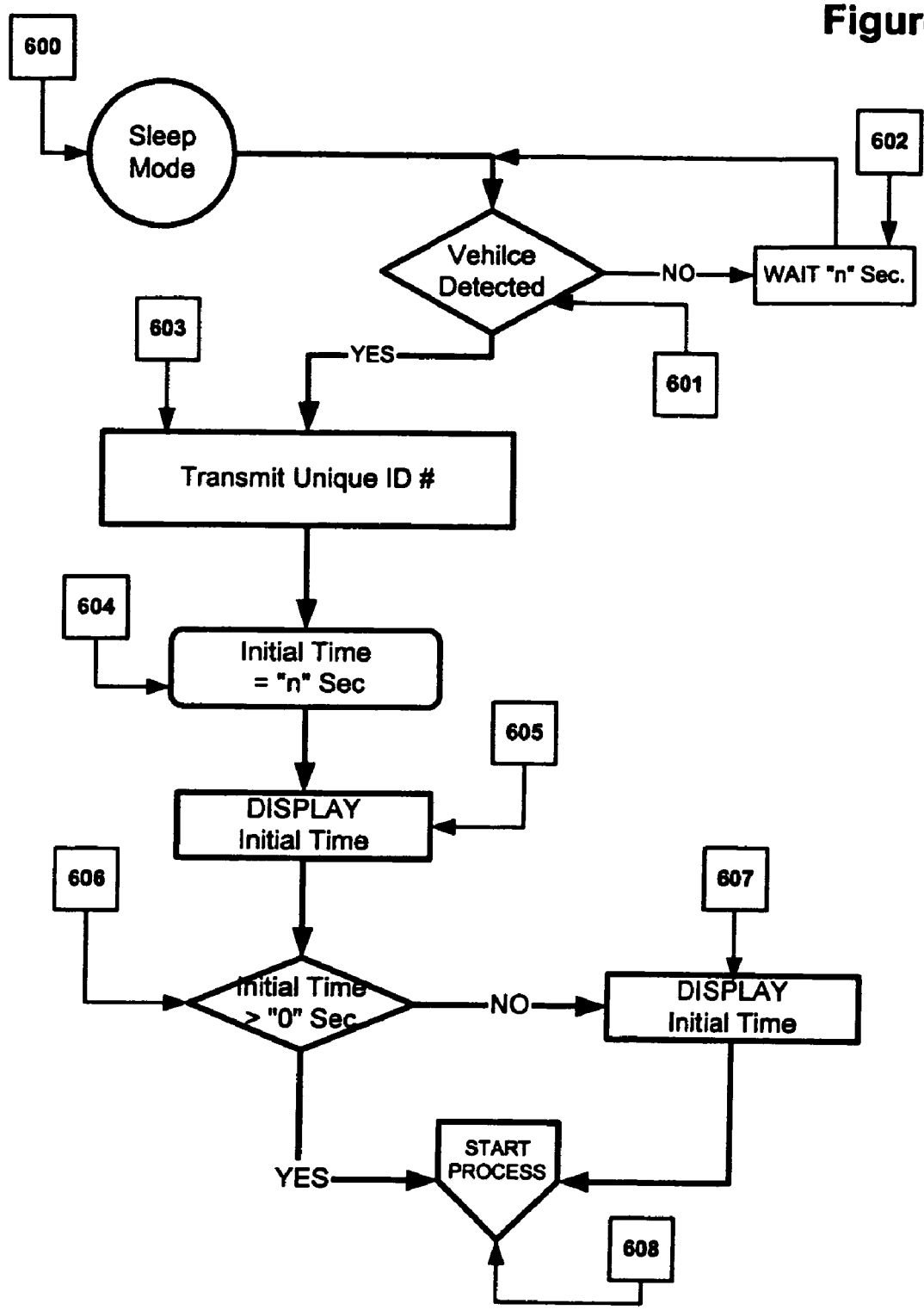
FIG. 5(a) is a flowchart of an exemplary process in which T.I.P.P.S. initiates the process to detect the presence of a vehicle stationary/parked/idling in the metered zone, according to at least one embodiment of the present invention.
Figure 5B:
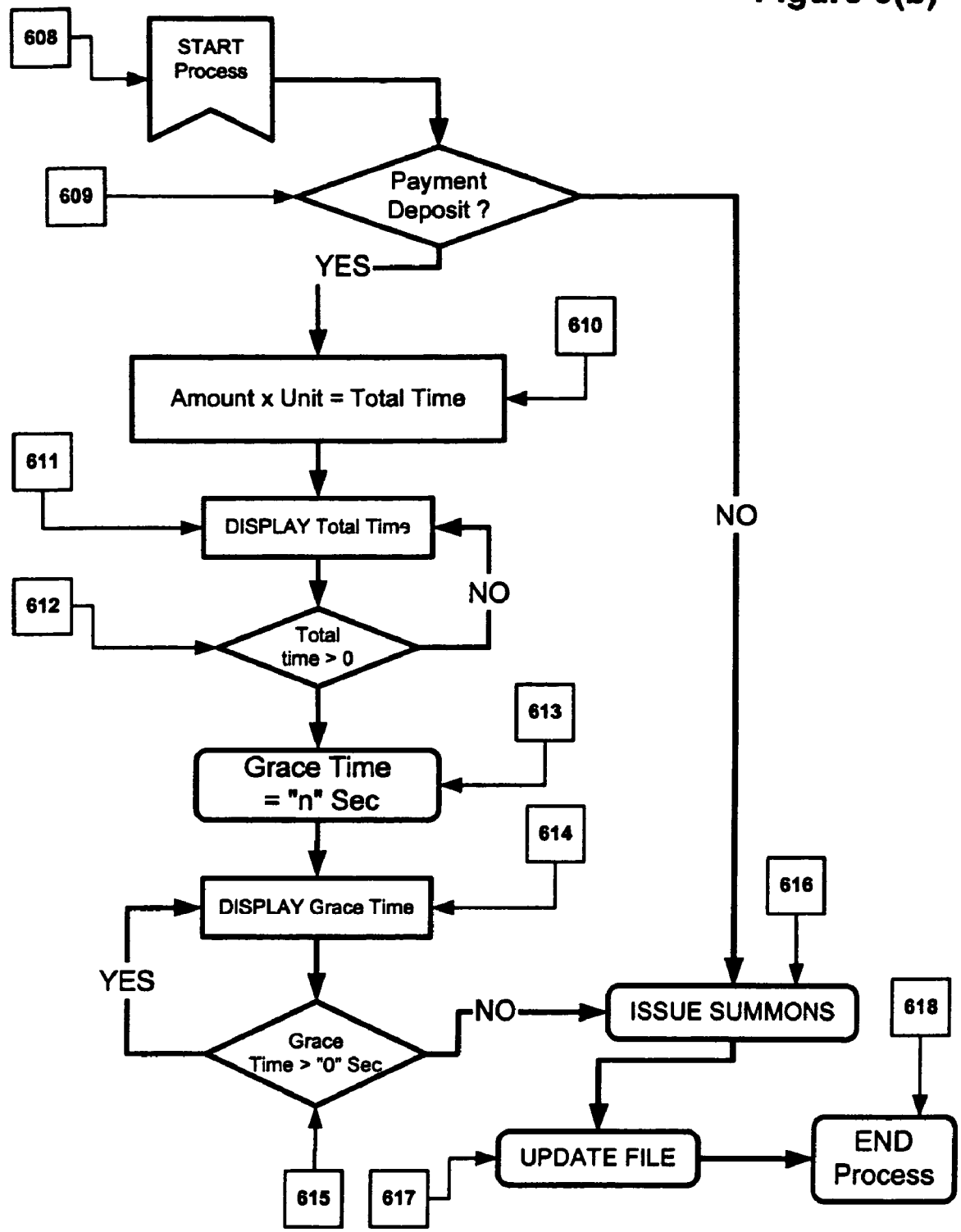
FIG. 5(b) is a flowchart of an exemplary process in which T.I.P.P.S. resumes the process of monitoring the presence of a stationary/parked/idling vehicle and prepares to issue a summons if a violation occurs, according to at least one embodiment of the present invention.

FIG. 5(a)-5(b) represent a flowchart of an exemplary process, in which T.I.P.P.S. mounted inside the parking meter initiates the process 601 to detect the presence of a vehicle in the metered zone. To lower power consumption, T.I.P.P.S. is programmed to go into a sleep mode 600 if there is no activity in the metered zone. If there is no vehicle sensed in the metered zone, T.I.P.P.S. waits for "n" seconds 602 and goes back to sleep mode 600. If the presence of a vehicle is detected in the metered zone, T.I.P.P.S. initiates broadcasting a unique T.I.P.P.S. identifying number 603.

As soon as the acknowledgement of transmission is completed, T.I.P.P.S. begins the initial count down for "n" minutes 604. The "n" minute's countdown 605 of this embodiment of the invention is displayed on the LCD panel of T.I.P.P.S. 203. If the initial "n" minutes have passed, it informs the A.R.C.S. that a violation has occurred and a summons is being issued. In the absence of A.R.C.S. a summons is issued to the vehicle (to be delivered by mail/email/automatic deduction if authorized). As an alternative process, no violation transaction will be recorded if the vehicle is moved out of the metered zone within a grace period of "n" minutes. If the coin/bills/cards are deposited into the collection slot 609, the total amount 610 of parking time is displayed on the parking meter 611. If the displayed parking time is used up 612, the parking device provides the grace period of "n" minutes 613. The grace time 614 is displayed on the T.I.P.P.S. display panel 203. If the defined grace period 615 is used up, the parking violation is recorded and a summons 616 is issued. If the operator of vehicle deposits the coin/bills/cards within the grace period 613, the parking meter displays the calculated time of grace time used after subtracting the actual owed time. The T.I.P.P.S. updates its log file 617 and goes back to scan mode. Also during the grace period, if the vehicle decides to leave the parking area without paying the balance, a violation transaction is recorded and a summons is issued. The payment may include credit card, special parking permit, debit card, a particular token or any other available means.

Figure 6:
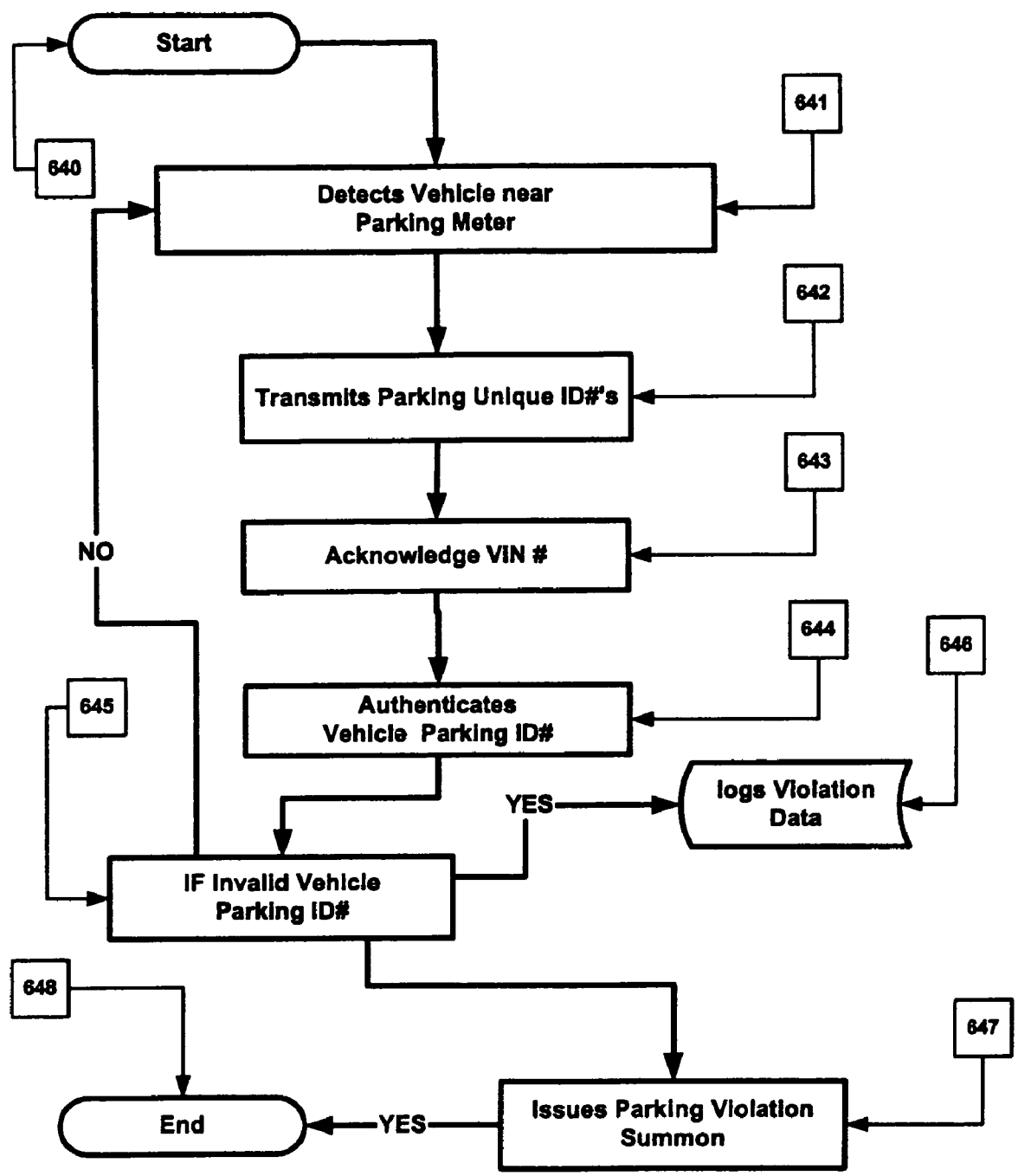
FIG. 6 is a flowchart of an exemplary process of T.I.P.P.S. communicating with the A.R.C.S. and the vehicle if it is equipped with a special parking tag, according to at least one embodiment of the present invention.

FIG. 6 is a flowchart of an exemplary process, in which a special parking authorisation number that is issued to defined designated group of individuals as suitably determined by the law enforcement officials is shown interacting with T.I.P.P.S. In step 641, T.I.P.P.S. detects the presence of the vehicle. In step 642, T.I.P.P.S. transmits the T.I.P.P.S. unique identifier and in the process the A R.C.S. transmits the vehicle identification information along with the special parking authorization number at step 643. In step 644, T.I.P.P.S. authenticates the special parking authorization number. If the special parking authorisation number is valid, it logs the transaction at step 646. In case, a violation transaction is logged at step 646; and, a violation summons is issued to the vehicle at step 647.

When the vehicle is moves out of the metered zone before time expires, the T.I.P.P.S. clears the balance time and the display time is reset back to zero.

Figure 7:
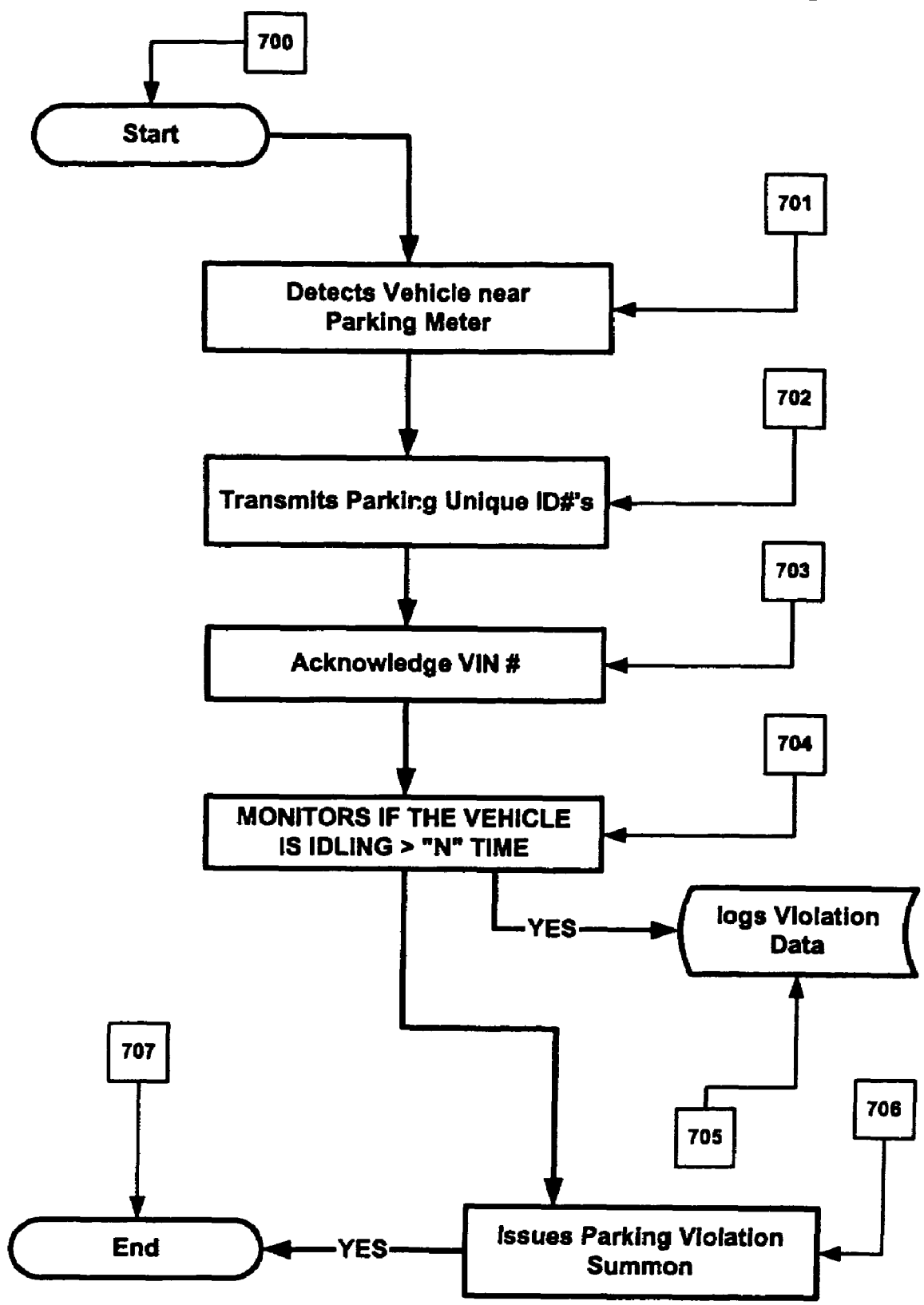
FIG. 7 is a flowchart of an exemplary process of T.I.P.P.S. equipped with idling sensors, according to at least one embodiment of the present invention.

FIG. 7 is a flowchart of an exemplary process, in which T.I.P.P.S. is monitoring the idling vehicle stationary/parked. In step 701, T.I.P.P.S. detects the presence of the vehicle. In step 702 T.I.PP.S. transmits the T.I.P.P.S. unique identifier and the A.R.C.S. transmits the vehicle id information at step 703. In step 704 the idling sensor is activated. Simultaneously timer is activated and monitors the idling time and logs the violation at step 705. If the idling time exceeds the pre-defined time a violation summons at step 706 is issued to the vehicle.

Figure 8:
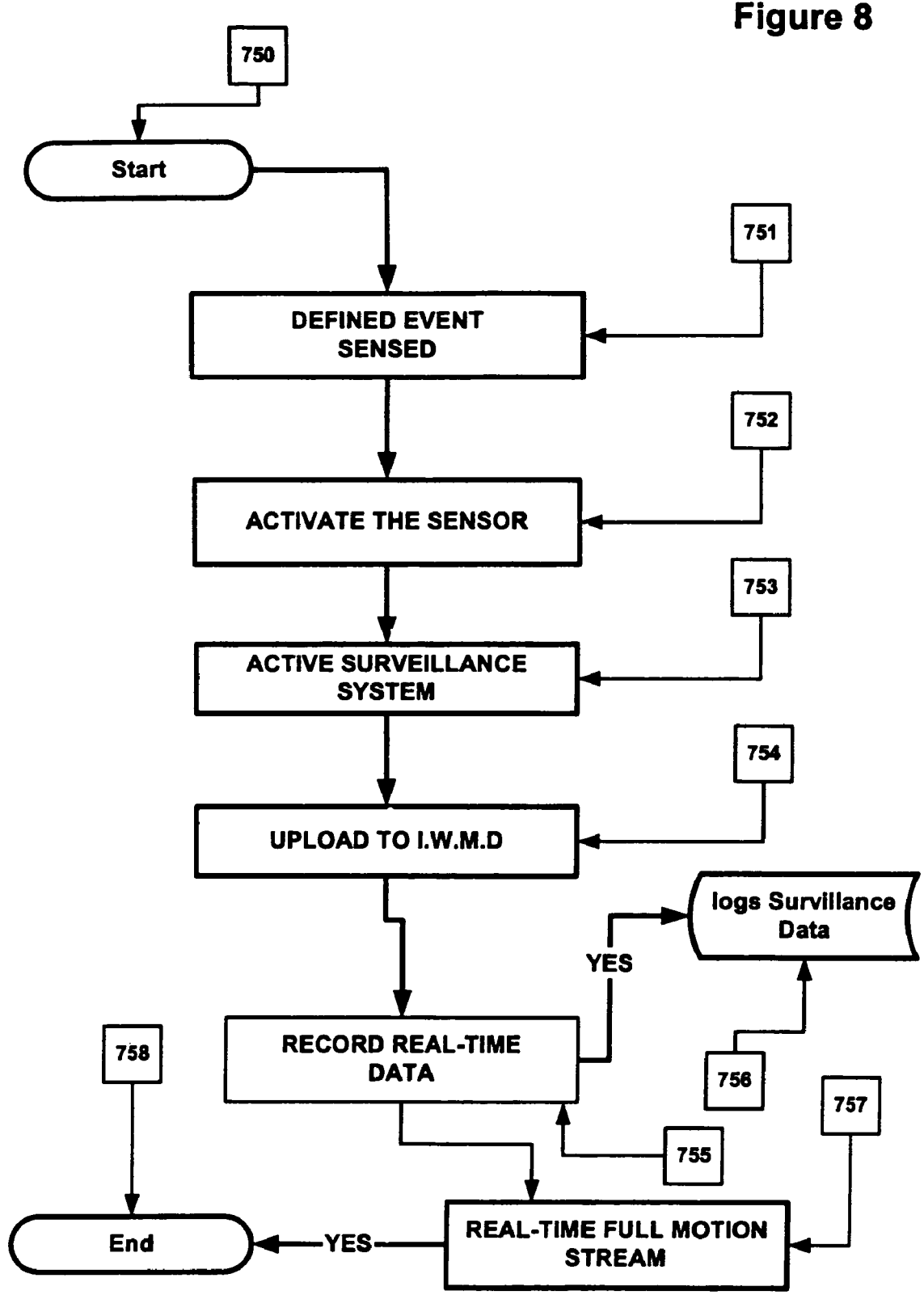
FIG. 8 is a flowchart of an exemplary process of T.I.P.P.S. equipped with a miniature time-lapse surveillance system, according to at least one embodiment of the present invention.

FIG. 8 is a flowchart of an exemplary process, of T.I.P.P.S. equipped with a miniature time-lapse surveillance system which is defined hereinafter. In step 751, an undefined event is sensed. The impact/shock/sound/vibration sensor 752 is activated. The miniature surveillance system 753 is placed in active mode.

In step 754, the active surveillance system uploads the surveillance data to I.W.M.D. and activates the real-time full motion image streaming at step 757. Simultaneously the real-time media streaming is recorded on the local storage drive at step 755. The transaction is logged in at step 756. Any significant event involving T.I.P.P.S. will simultaneously activate the adjacent T.I.P.P.S. and provide a real-time full motion stream to I.W.M.D.

We claim:

1. A system for enforcement of parking regulations with respect to vehicles situated in a metered zone, said system comprising:
    a parking meter comprising a wireless monitoring device for monitoring conditions within a defined space and a transceiver for receiving signals from a vehicle pertaining to information defining said vehicle, said meter being operatively configured to determine violations of a legal requirement with respect to vehicles in the metered zone;
    a vehicle control system mounted in said vehicle operatively configured to generate a signal defining information associated with said vehicle;
    a device capable of automatically issuing a summons to said vehicle control system for said vehicle that has been situated in the metered zone and which has violated a legal requirement with respect to vehicles in the metered zone based on input from said meter and from said vehicle control system.

2. The method system of claim 1, wherein the vehicle is selected from the group consisting of an automobile, a truck, a bus, tractor, crane, a 2- or 3-wheel conveyance.

3. The system of claim 2, wherein the signal generated by the vehicle control system is generated in the form of:
    Radio frequency;
    WLAN IEEE 802.11 x & 802.1 6x standards;
    Blue tooth means; and
    Infrared means.

4. The system of claim 1, wherein the condition monitored is the presence of a vehicle in the metered zone.

5. The system of claim 1, wherein the wireless monitoring device comprises at least one surveillance camera.

6. The method according to claim 1, wherein the information defining said vehicle includes at least one of:
    vehicle identification number;
    vehicle registration information;
    pollution emission information;
    and past violation summons information.

7. The system according to claim 6, wherein a plurality of surveillance cameras are mounted facing in all four directions.

8. The system according to claim 1, wherein the system further includes means for the meter to transmit a meter unique identifier to the vehicle control system.

9. The method according to claim 1, wherein the meter further comprises a means to transmit information from the meter to the vehicle control system, such information informs the operator of the vehicle that the vehicle is stationary/parked/idling in a metered zone.

10. The system according to claim 1, wherein the system further comprises in the meter:
    a time-lapse recorder with sufficient amount of recording disk space; a shock/vibration/sound/impact sensor.

11. The system of claim 1, wherein the wireless monitoring device detects at least one of:
    a vibration; or
    a sound.

12. The system of claim 1, wherein the wireless monitoring device detects at least one of:
    a shock; or
    a collision.

13. The system of claim 1, wherein the wireless monitoring device monitors the volume and flow of traffic to help co-ordinate traffic light sequencing for facilitating optimum traffic movement.

14. A system for monitoring pollution produced by an identified idling vehicle, said system comprising:
    a parking meter comprising a wireless monitoring device for monitoring emission from a vehicle, said meter being operatively configured to determine violations of a legal requirement with respect to vehicles in the metered zone;
    a vehicle control system mounted in said vehicle operatively configured to generate a signal defining information associated with said vehicle;
    a device capable of automatically issuing a summons to said vehicle control system for said vehicle that has been situated in the metered zone and which has violated a legal requirement with respect to vehicles in the metered zone based on input from said meter and from said vehicle control system.

15. A system for reducing the utilization of human resources in the issuance of summons, said system comprising:
    a parking meter comprising a wireless monitoring device for monitoring conditions within a defined space and a transceiver for receiving signals from a vehicle pertaining to information defining said vehicle, said meter being operatively configured to determine violations of a legal requirement with respect to vehicles in the metered zone;
    a vehicle control system mounted in said vehicle operatively configured to generate a signal defining information associated with said vehicle;
    a device capable of automatically issuing a summons to said vehicle control system for said vehicle that has been situated in the metered zone and which has violated a legal requirement with respect to vehicles in the metered zone based on input from said meter and from said vehicle control system.

16. A method for reducing the utilization of human resources and operation costs associated with the issuance of summons, said method comprising:
    installing a system in a parking meter; said system comprising a device comprising a wireless monitoring device for monitoring conditions within a defined space and a transceiver for receiving signals from said vehicle pertaining to information defining said vehicle, said meter being operatively configured to determine violations of a legal requirement with respect to vehicles in the metered zone;

providing a vehicle control system to said vehicle operatively configured to generate a signal defining information associated with said vehicle; and installing a device capable of automatically issuing a summons to said vehicle control system for said vehicle that has been situated in the metered zone and which has violated a legal requirement with respect to vehicles in the metered zone based on input from said meter and from said vehicle control system.

* * * * *